(12) United States Patent
Nguyen et al.

(10) Patent No.: US 10,591,968 B2
(45) Date of Patent: Mar. 17, 2020

(54) SELECTIVELY-ENABLING BATTERY BACK-UP POWER BASED ON A POWER DEMAND

(71) Applicant: HEWLETT PACKARD ENTERPRISE DEVELOPMENT LP, Houston, TX (US)

(72) Inventors: Hai Ngoc Nguyen, Spring, TX (US); Han Wang, Sugar Land, TX (US); Patrick A. Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/917,768

(22) PCT Filed: Sep. 30, 2013

(86) PCT No.: PCT/US2013/062715
§ 371 (c)(1),
(2) Date: Mar. 9, 2016

(87) PCT Pub. No.: WO2015/047415
PCT Pub. Date: Apr. 2, 2015

(65) Prior Publication Data
US 2016/0224088 A1 Aug. 4, 2016

(51) Int. Cl.
*G06F 1/30* (2006.01)
*G06F 1/28* (2006.01)
*G06F 1/26* (2006.01)

(52) U.S. Cl.
CPC .............. *G06F 1/30* (2013.01); *G06F 1/263* (2013.01); *G06F 1/28* (2013.01)

(58) Field of Classification Search
None
See application file for complete search history.

(56) References Cited

U.S. PATENT DOCUMENTS

| 7,343,276 B1 | 3/2008 | Tsukamoto et al. |
| 8,533,514 B2 | 9/2013 | Rogers |

(Continued)

FOREIGN PATENT DOCUMENTS

| CN | 101393473 | 3/2009 |
| CN | 102593941 A | 7/2012 |

(Continued)

OTHER PUBLICATIONS

J.S. Williams et al., Megacell—A Design System for CMOS VLSI, Sep. 1984 (5 pages).

(Continued)

*Primary Examiner* — Danny Chan
(74) *Attorney, Agent, or Firm* — Hewlett Packard Enterprise Patent Department

(57) ABSTRACT

Described are examples of back-up power apparatuses and systems including such back-up power apparatuses. An example may include a battery module, and a back-up power control module to determine a back-up power demand of a host device and selectively enable an output of power from the battery module to the host device if the battery module has a power capacity greater than the back-up power demand.

18 Claims, 8 Drawing Sheets

(56) References Cited

U.S. PATENT DOCUMENTS

| | | | |
|---|---|---|---|
| 2002/0124192 A1* | 9/2002 | Odaohhara | G06F 1/30 713/300 |
| 2004/0010649 A1* | 1/2004 | Weaver | H02J 9/00 710/302 |
| 2006/0072283 A1* | 4/2006 | Thompson | G06F 1/30 361/600 |
| 2007/0245162 A1* | 10/2007 | Loffink | G06F 1/32 713/300 |
| 2008/0052544 A1* | 2/2008 | Hsieh | H02J 1/14 713/300 |
| 2010/0164290 A1 | 7/2010 | Chiang | |
| 2010/0314944 A1 | 12/2010 | Kotlyar | |
| 2011/0016342 A1* | 1/2011 | Rowan | G06F 11/3006 713/340 |
| 2011/0189936 A1* | 8/2011 | Haspers | A47B 81/00 454/184 |
| 2012/0109555 A1* | 5/2012 | Humphrey | H01M 10/4207 702/63 |
| 2012/0248876 A1 | 10/2012 | Tamura | |
| 2013/0046415 A1 | 2/2013 | Curtis | |
| 2013/0091483 A1 | 4/2013 | Chen et al. | |
| 2013/0198541 A1* | 8/2013 | Rabii | G06F 1/26 713/320 |
| 2013/0249289 A1* | 9/2013 | Patel | H02J 3/28 307/26 |
| 2014/0183962 A1* | 7/2014 | Qian | H02J 7/025 307/104 |
| 2015/0349585 A1* | 12/2015 | Budde | H02J 9/062 307/66 |

FOREIGN PATENT DOCUMENTS

| | | |
|---|---|---|
| CN | 103078354 A | 5/2013 |
| CN | 103283107 A | 9/2013 |
| JP | 1188918 | 3/1999 |
| JP | 5021709 | 9/2012 |
| TW | 201308830 A | 2/2013 |

OTHER PUBLICATIONS

The International Search Report and the Written Opinion of the International Searching Authority for PCT/US2013/062715; dated Jun. 30, 2014; 11 pages.

* cited by examiner

SELECTIVELY-ENABLING BATTERY BACK-UP POWER BASED ON A POWER DEMAND

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Back-up power sources may sometimes include energy components such as capacitors or batteries.

BRIEF DESCRIPTION OF THE DRAWINGS

The detailed description section references the drawings, wherein.

all in which various embodiments may be implemented

DETAILED DESCRIPTION OF EMBODIMENTS

Reliable power systems and back-up schemes for computing systems may help avoid or reduce the loss of critical data in the event of surprise losses or dips in main power. Devices that help accomplish this may sometimes include devices such as non-volatile memory and array controllers, which may be provided back-up power from energy components such as capacitors and batteries.

Energy components for providing back-up power may sometimes require a recharging period during which the energy components may be unavailable to provide back-up power. Though multiple energy components may be used m some instances to provide some assurance of the availability of back-up power, the number of energy components that can practically be used may be limited due to limited space. Fast-charging alternatives may be available, but these solutions may tend to generate a large amount of heat, which may lead to reduced battery lifecycles and an increase in overall cost.

Described herein are various implementations of back-up power apparatuses including a battery module and a back-up power control module. The back-up power control module may determine a back-up power demand of a host device and selectively enable an output of power from the battery module to the host device if the battery module has a power capacity greater than the back-up power demand. In various implementations, the selective-enabling of back-up power output may allow the battery module to be available to provide back-up power earner than may otherwise be possible if the output of back-up power was delayed until the battery module is fully charged.

Figure 1:
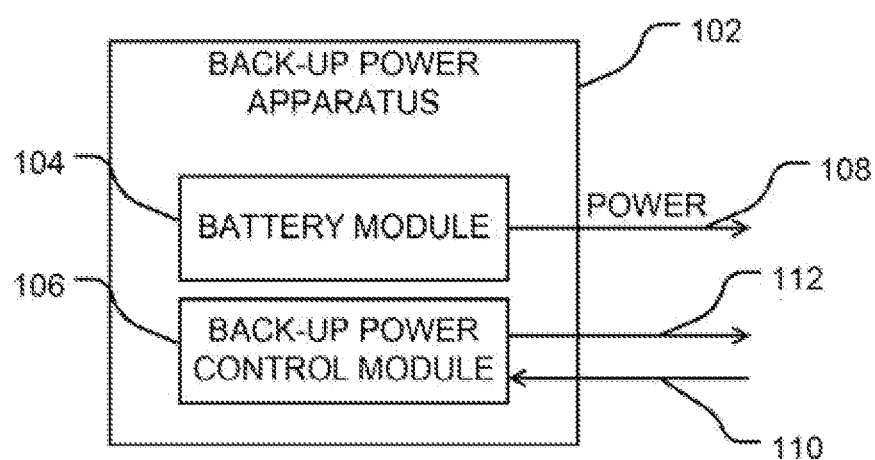
FIG. 1 is a block diagram of an example back-up power apparatus including a back-up power control module to selectively-enable the output of back-up power.

Referring now to the drawings. FIG. 1 is a block diagram of an example back-up power apparatus 102. The back-up power apparatus 102 includes a battery module 104 and a back-up power control module 106. The battery module 104 may compose an energy component to convert stored energy to electrical energy to deliver power 108 to at least one load (typically multiple loads) coupled to the back-up power apparatus 102. Examples of the battery module 104 may include, but are not limited to, a rechargeable battery, a capacitor (such as, e.g., supercapacitors, ultra-capacitors, etc.), and the like. Power 108, as used herein, may include current, voltage, electrical charge, watts, or other type of energy provided to the load from the battery module 104.

The back-up power apparatus 102 may be configured to be coupled to a host device (not illustrated here) for providing back-up power 108 to the host device. In various implementations, the back-up power control module 106 may selectively enable or disable the battery module 104 to provide the back-up power 108 to at least one load of the host device when main power supplying the load(s) fails, as described more fully herein. In various implementations, the back-up power control module 106 may be configured with additional functionalities. For example, the back-up power control module 106 may control power charging and discharging of the battery module 104 or other operations of the back-up power apparatus 102 such as, for example, analyzing, monitoring, or protecting the control module 106 and controlling communications with the host device. In various implementations, the back-up power control module 106 may be configured to provide protection to the back-up power apparatus 102 such as, but not limited to, short circuit protection, charge/discharge protection, current/voltage protection, temperature protection, communication accuracy/error robust protection, etc. Examples of the back-up power control module 106 may include, but are not limited to, a processor, circuit logic, a set of instructions executable by a processor, a microchip, a chipset, an electronic circuit, a microprocessor, a microcontroller, a central processing unit, or the like.

The back-up power control module 106 may determine whether to enable or disable the battery module 104 based at least m part on a power capacity of the battery module 104 and the back-up power demand of the load(s) of the host device. In various implementations, the back-up power control module 106 may receive a quantity of loads from the host device via the input port 110 and the back-up power control module 106 may determine the back-up power demand by estimating of the back-up power demand based on the quantity of loads of the host device and an estimated power demand per load. In the same or different embodiments, the back-up power control module 106 may determine the back-up power demand by averaging a plurality of outputs of back-up power 108 from the battery module 104 to the host device of a corresponding plurality of previous power loss events.

In various implementations, the back-up power apparatus 102 may include an output port 112 via which the back-up power control module 106 may transmit messages such as, for example, messages, to the host device, for example, indicating that the battery module 104 is enabled or disabled.

Figure 2:
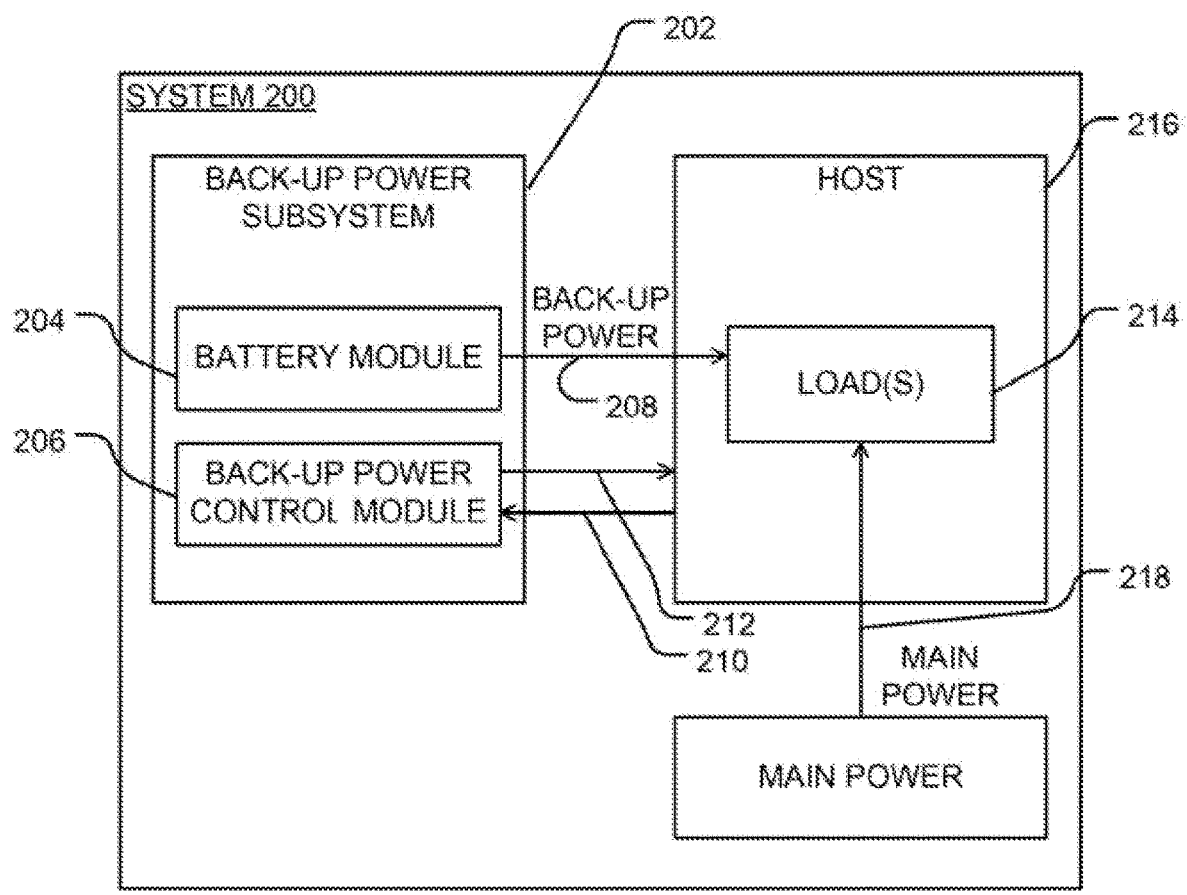
FIG. 2 is a block diagram of an example system including a back-up power subsystem including a back-up power control module to selectively-enable the output of back-up power.

A block diagram of an example system 200 is illustrated in FIG. 2. The various back-up power apparatuses described herein (such as, e.g., the back-up power apparatus 102 described herein with reference to FIG. 1 may be incorporated into various types of systems or may comprise an apparatus, which may be coupled with at least one computing device to form a system.

As illustrated in FIG. 2, the system 200 includes a back-up power subsystem 202 including a battery module 204 and a back-up power control module 206. The back-up power subsystem 202 may be operatively coupled to a host device 216. In various implementations, the back-up power control module 206 may be configured to communicate with the host device 216. For example, the communication between the back-up power control module 206 and the host device 216 may include a quantity of loads 214 of the host device 216, a status of the host device 216, among other things. In various implementations, the system 200 may include a plurality of back-up power subsystems 202 in parallel, operatively coupled to the host device 216.

The host device 216 may comprise a device such as, but not limited to, a computing device, a server, or any other computing system suitable to support the back-up power subsystem 202. The host device 216 may support at least one load 214. The load(s) 214 may compose an electrical circuit, electrical impedance, or other type of circuit capable of receiving power 208 from the back-up power subsystem 202. In various implementations, the load(s) 214 may comprise, for example, a storage array controller, non-volatile memory (such as, e.g., non-volatile dual in-line memory), or other load to facilitate backing up of data of the host device 216 to memory such as flash or persistent memory in the event of loss of main power 218 (such as, e.g., power failure, power dip, etc.) to the system 200 or host device 216.

The back-up power subsystem 202 may provide back-up power 208 to the load(s) 214 of the host device 216 in the event of loss of main power 214, but may the back-up power control module 206 may selectively enable or disable the output of back-up power 208 from the battery module 204 based on a power capacity of the battery module 204 and a back-up power demand of the load(s) 214 of the host 216. For determining the power capacity of the battery module 204, the back-up power control module 206 may use an actual available power capacity of the battery module 204 or may factor in some diminishment in power capacity. For example, an actual power capacity may be reduced by a margin percentage as the battery module 204 ages and/or by a tolerance percentage given the particular operating conditions of the system 200 or host device 216. For example, the back-up power control module 205 may calculate an adjusted power capacity, $PC_{adjusted}$, of the battery module 204 as follows:

$$PC_{adjusted} = \frac{PC_{actual}}{1+x+y}$$

where $PC_{actual}$ is the actual power capacity of the battery module 204, x is the tolerance percentage, and y is the margin percentage.

The back-up power control module 206 may determine the back-up power demand of the load(s) 214 of the host device 216 by estimating the back-up power demand or calculating an average of back-up power demands of the host device 216 of previous power loss events. In various implementations, the back-up power control module 206 may receive a quantity of the load(s) 214 from the host device via me input port 210, and the back-up power control module 206 may determine the estimated back-up power demand, $PD_E$, based on the quantity of loads, n, and an estimated or typical power demand per load. $PD_{EL}$, as follows.

$$PD_E = n \times PD_{EL}$$

For example, if the back-up power apparatus 202 receives a quantity of 24 loads from the host device 216 and a pre-determined estimated or typical power demand per load value is n watts (W)/load, the back-up power control module 206 may determine the estimate of the back-up power demand, $PD_E$, to be about 24 nW.

In various implementations, the host device 216 may provide an actual number of load(s) 214 supported by the host device 216 (e.g., all operating loads) or some number fewer than all operating load(s) 214. For example, in some implementations, the host 216 may prioritize the load(s) 214 such that only a subset of the load(s) 214 would receive back-up power 208 after a power loss event.

In the same or other embodiments, the back-up power control module 206 may determine the back-up power demand by averaging a plurality of outputs of power 208 from the battery module 204 to the host device 218 of a corresponding plurality of previous power loss events. In various ones of these implementations, the back-up power control module 206 may first attempt to use an average of the back-up power demand, and then use an estimate if the average is not available. For example, if the quantity of loads changes, the average was not calculated previously, etc., an average back-up power demand of those loads may not be available.

After determining the backup power demand of the host 216, the back-up power control module 206 may selectively enable or disable the battery module 204. The back-up power control module 206 may selectively enable or disable the battery module 204 based at least in part on the power capacity of the battery module 204 and the determined back-up power demand of the host 216. In various implementations, the back-up power control module 206 may selectively enable the battery module 204 if the battery module 204 has a power capacity at least equal to the back-up power demand. In various ones of the same or different implementations, the back-up power control module 206 may selectively disable the battery module 204 if the battery module 204 has a power capacity less than the back-up power demand.

In various implementations, the back-up power apparatus 202 may transmit a message via an output sort 212 to the host device 216 indicating that the battery module 204 is enabled or disabled.

In the enabled state, the battery module 204 may wait for a power loss event at which time the battery module 204 may supply back-up power 208 to the host 216 for supplying the load(s) 214. When the battery module 206 is the disabled state, the back-up power control module 206 may continually or periodically check the power capacity of the battery module 204 to determine whether the power capacity has increased to a level at least equal to the back-up power demand of the host 216.

FIG. 3-FIG. 8 are flowcharts of example methods performed on a system to selectively enable a back-up power subsystem to provide back-up power to at least one load of a host device when main power supplying the at least one load fails. It should be noted that various operations discussed and/or illustrated may be generally referred to as multiple discrete operations in turn to help in understanding various implementations. The order of description should not be construed to imply that these operations are order dependent, unless explicitly stated. Moreover, some implementations may include more or fewer operations than may be described.

Figure 3:
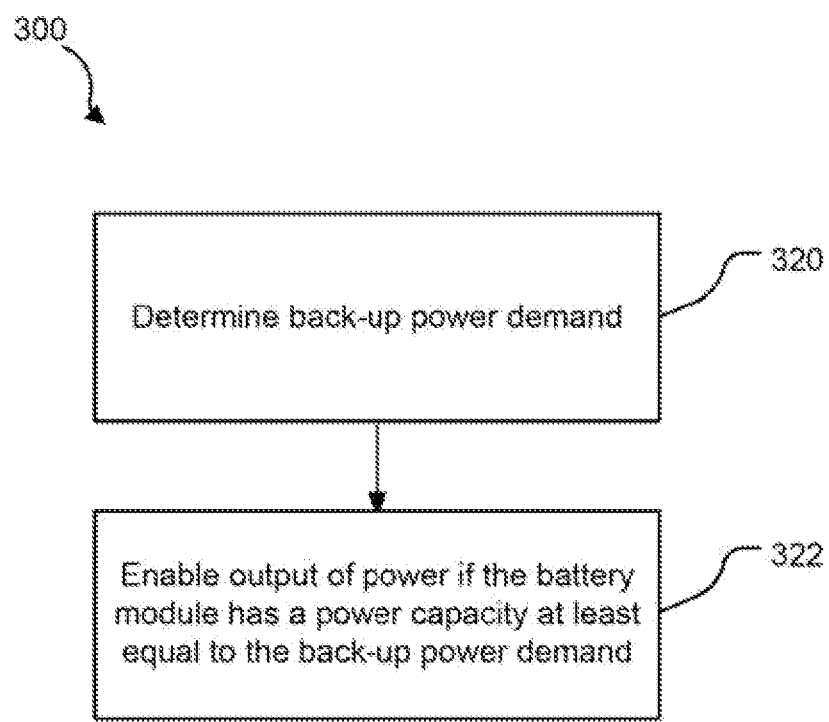
FIG. 3-FIG. 8 are flowcharts of example methods for selectively enabling the output of back-up power by a back-up power apparatus.

Turning now to FIG. 3, a method 300 for selectively enabling an output of power from a battery module to a host device for a power loss event, in accordance with various implementations, may begin or proceed with determining a back-up power demand of the host device, at block 320. In various implementations, the back-up power demand may be determined by estimating the back-up power demand based on a quantity of loads of the host device and an estimated power demand per load, or by averaging a plurality of outputs of power from me battery module to the host device of a corresponding plurality of previous power loss events. In various ones of these implementations, the back-up power demand may be determined by first determining if either an average back-up power demand value or multiple values which may be averaged are available, and if not, then estimating the back-up power demand based on a quantity of loads of the host device and an estimated power demand per load (or using an estimate already calculated and stored in the back-up power subsystem).

The method 300 may proceed to block 322 with selectively enabling an output of power from the battery module to the host device if the battery module has a power capacity greater than the back-up power demand. In various implementations, the output of power from the battery module to the host device may be selectively enabled if the battery module has a power capacity at least equal to the back-up power demand. Once enabled, the battery module may wait for a power loss event to the host device at which time the battery module may provide back-up power to the load(s) of the host device.

Figure 4:
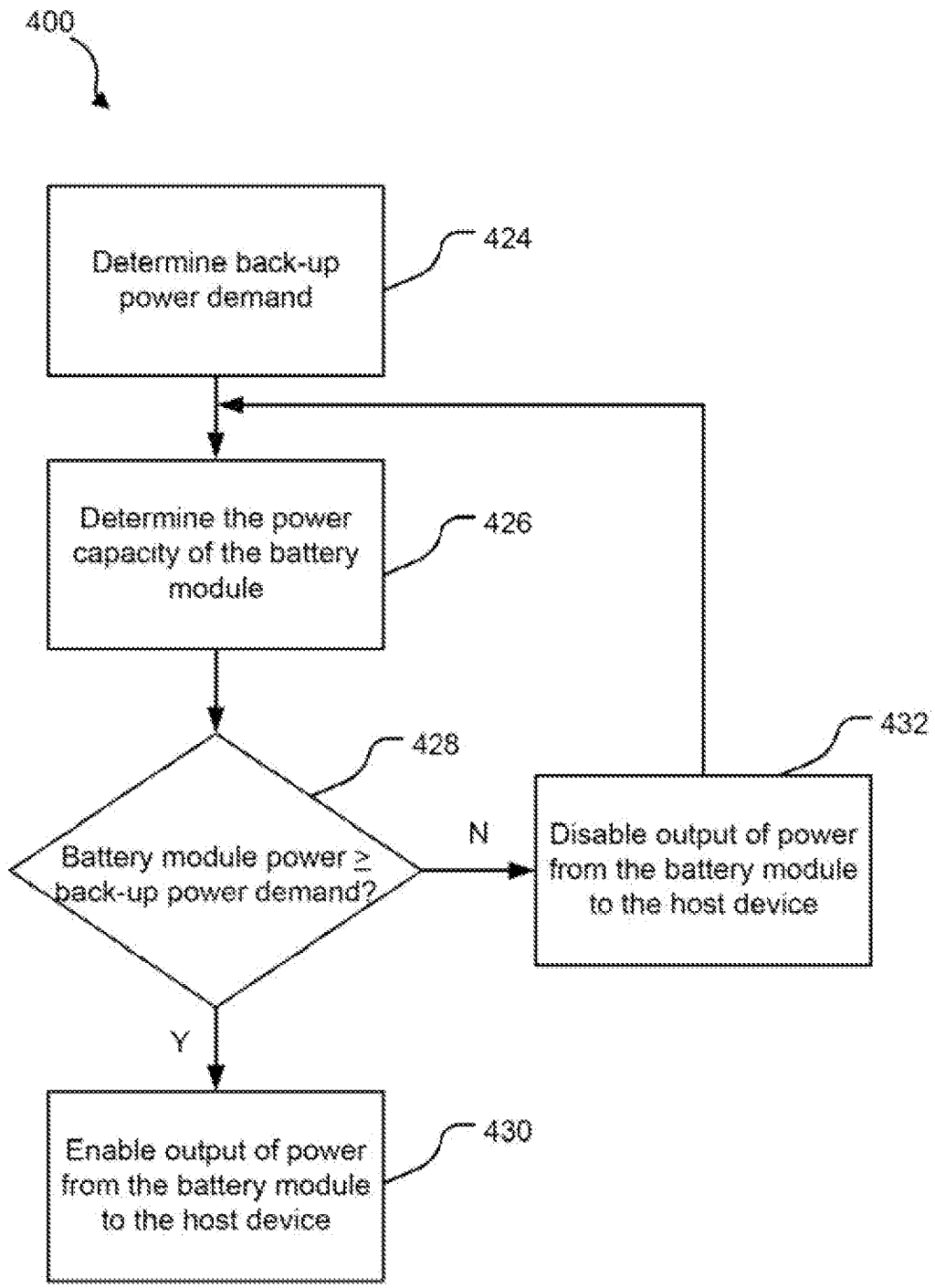

At FIG. 4, a method 400 for selectively enabling an output of power from a battery module to a host device for a power loss event, in accordance with various implementations, may begin or proceed with determining a back-up power demand of the host device, at block 424. In various implementations, the back-up power demand may be determined by estimating the back-up power demand based on a quantity of loads of the host device and an estimated power demand per load, or by averaging a plurality of outputs of power from the battery module to the host device of a corresponding plurality of previous power loss events, as described herein.

At block 426, the method 400 may proceed with determining the power capacity of the battery module in various implementations, the power capacity may compose the power capacity of the battery module factoring a tolerance percent and/or a margin percent, as described herein.

The method 400 may proceed to block 428 with comparing the back-up power demand and the power capacity of the battery module to determine whether to disable or enable the output of power from the battery module. If the power capacity of the battery module is greater than or at least equal to the back-up power demand, the method 400 may proceed to block 430 by enabling the output of power from a battery module to the host device for a power loss event. If, on the other hand, the power capacity of the battery module is less than the back-up power demand, the method 400 may proceed to block 432 by disabling the output of power from a battery module to the host device. The method 400 may then proceed back to block 426 for determining whether the power capacity of the battery module has increased sufficiently to provide back-up power to the host device.

Figure 5:
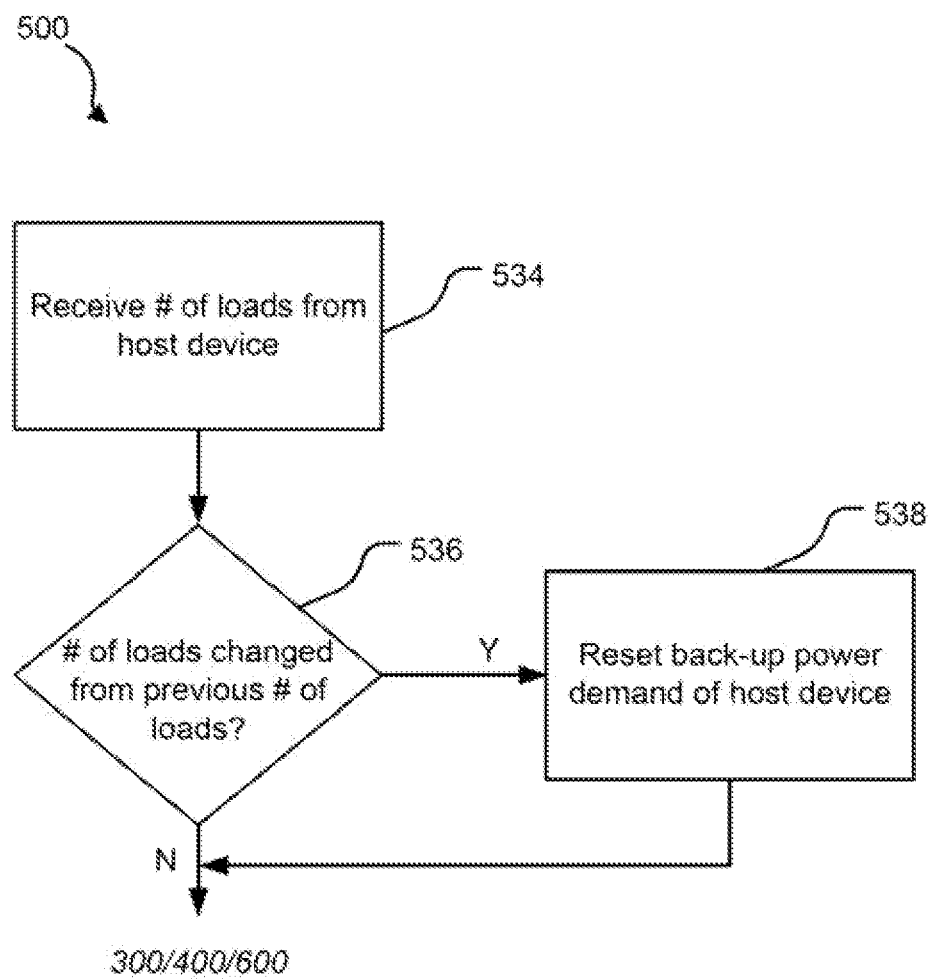

FIG. 5 illustrates an example method 500 for determining whether a quantity of loads of the host device has changed from a previous power loss event. As described herein, in various implementations, the back-up power demand of a host device may be determined based at least in part on a quantity of loads of the host device, and in some implementations, an average of a plurality of back-up power demands from previous power loss events may be used when determining whether to selectively enable a battery module of a back-up power subsystem.

At block 534, the method 500 may begin or proceed with receiving a quantity of loads from a host device, and then to block 536 by determining whether the quantity of loads has changed from a previous quantity of loads. In various implementations, such a change may be due to a change m operation of the host device, a re-prioritization of loads by the host device, etc. If it is determined that the quantity of loads has changed, the method 500 may proceed with resetting the stored average back-up power demand, and then proceed to determining whether to selectively enable the output of power by the battery module, as described herein (such as, e.g., in accordance with one or more of methods 300, 400, or 600 described herein with reference to FIG. 3, FIG. 4, and FIG. 6, respectively). If, on the other hand, it is determined that the quantity of load has not changed, the method 500 may proceed to determining whether to selectively enable the output of power by the battery module, without resetting the stored average back-up power demand value.

Figure 6:
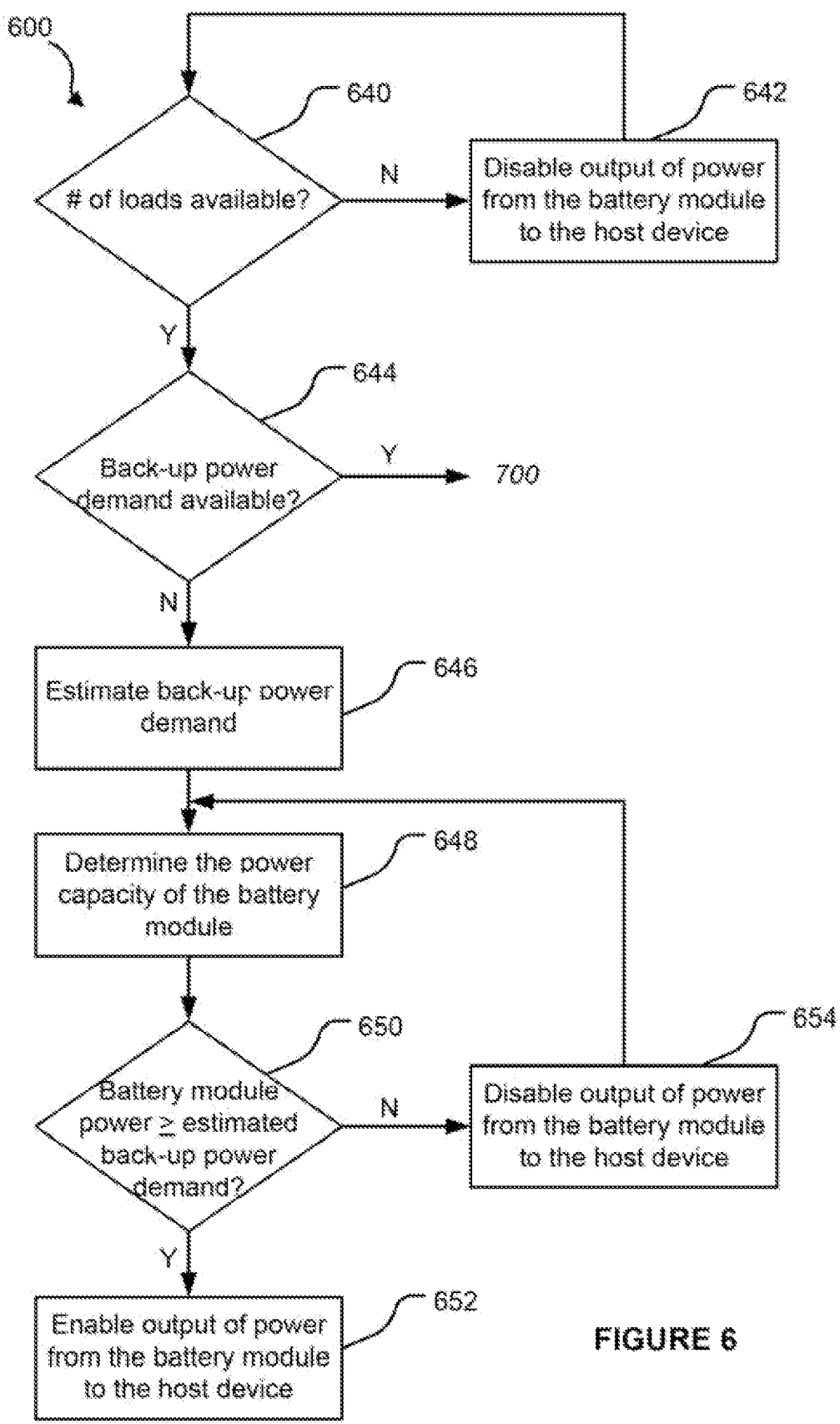

At FIG. 6, a method 600 for selectively enabling an output of power from a battery module to a host device for a power loss event, in accordance with various implementations, may begin or proceed with determining whether a quantity of loads is available, at block 640. In various implementations, the quantity of loads may be provided by a host device, and may comprise a total number of loads supported by the host device or some quantity fewer than a total number of the load, if the quantity of loads is not available, the method 600 may proceed to block 642 by disabling the output of power from the battery module to the host device until the quantity of loads is available.

If, on the other hand, the quantity of loads is available, the method 600 may proceed to block 644 with determining whether a back-up power demand value is available. In various implementations, the back-up power demand value may comprise a previously-determined value such as, for example, an average of previous actual back-up power demands for previous power loss events, if a back-up power demand value is available, the method 600 may proceed to method 700 described later with reference to FIG. 7.

If, on the other hand, the back-up power demand value is not available, the method 600 may proceed with estimating the back-up power demand value at block 646. In various implementations, the back-up power demand value may be estimated based at least in part on the quantity of loads and an estimated or typical back-up power demand per load.

The method 600 may proceed to block 648 with determining the power capacity of the battery module, and comparing the power capacity of the battery module to the estimate of the back-up power demand at block 650. If the power capacity of the battery module is greater than or at least equal to the back-up power demand, the method 600 may proceed to block 652 by enabling the output of power from a battery module to the host device for a power loss event. If, on the other hand, the power capacity of the battery module is less than the back-up power demand, the method 600 may proceed to block 654 by disabling the output of power from a battery module to the host device. The method 600 may then proceed back to block 648 for determining whether the power capacity of the battery module has increased sufficiently to provide back-up power to the host device.

Figure 7:
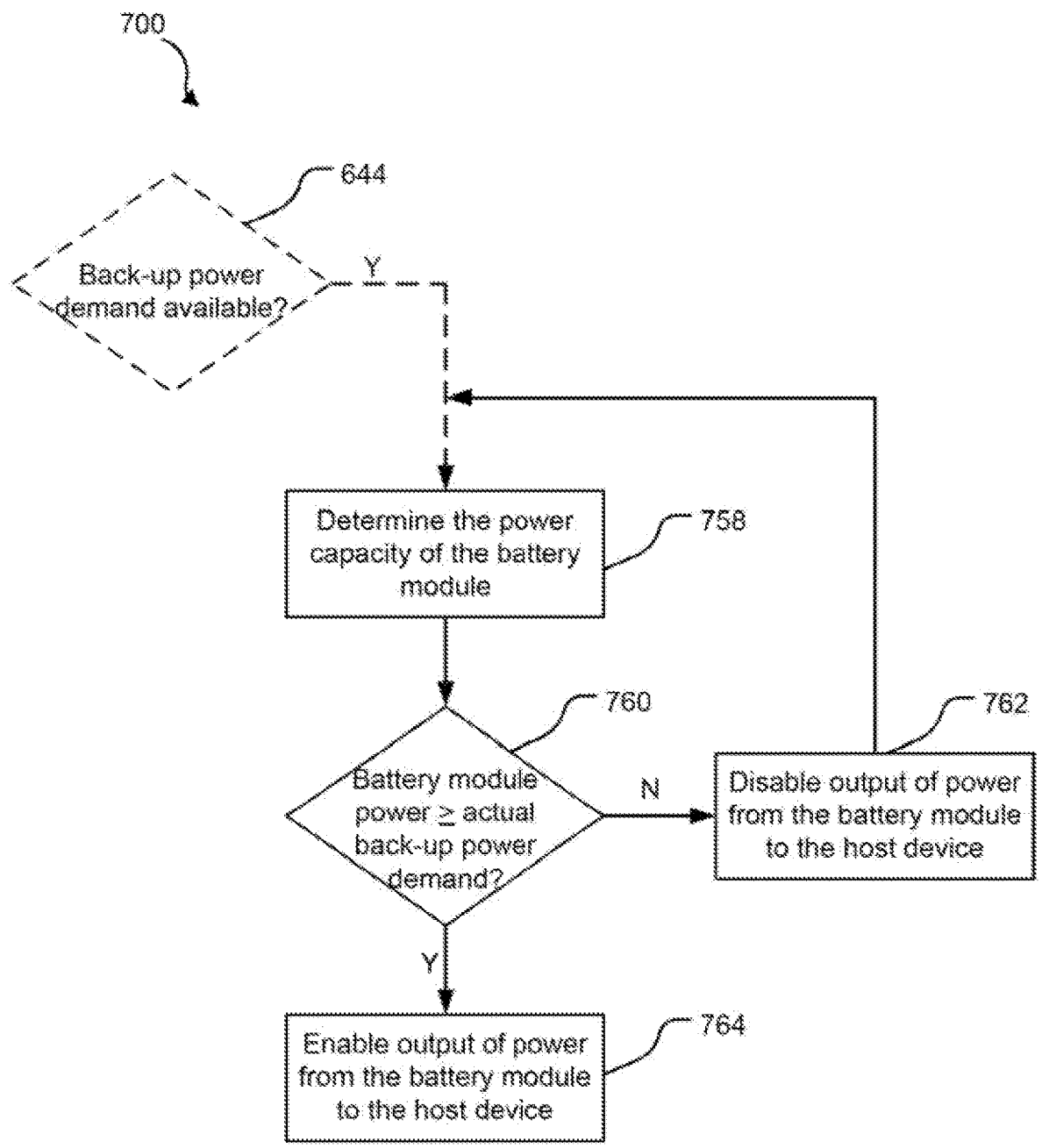

If the back-up power demand value is available at block 644, the method 600 may proceed to method 700 of FIG. 7, as noted above. At FIG. 7, the method 700 for selectively enabling an output of power from a battery module to a host device for a power loss event, in accordance with various implementations, may begin or proceed with block 758 with determining the power capacity of the battery module, and comparing the power capacity of the battery module to the back-up power demand at block 760. If the power capacity of the battery module is greater than or at least equal to the back-up power demand, the method 700 may proceed to block 764 by enabling the output of power from a battery module to the host device for a power loss event. If, on the other hand, the power capacity of the battery module is less than the back-up power demand, the method 700 may proceed to block 762 by disabling me output of power from a battery module to the host device. The method 700 may then proceed back to block 758 for determining whether the power capacity of the battery module has increased sufficiently to provide back-up power to the host device.

In various implementations, once the battery module of a back-up power subsystem is enabled, the battery module may watt for a power loss event for providing back-up power to the loads of a host device. When providing back-up power to the loads of the host device, a back-up power control module of the back-up power subsystem may calculate the actual back-up power provided to the host device. The calculated value may be used for the back-up power demand value for determining whether to selectively enable the battery module or may be used for averaging with at least one other actual back-up power demand value so that the average value may be used for the back-up power demand value for determining whether to selectively enable the battery module.

Figure 8:
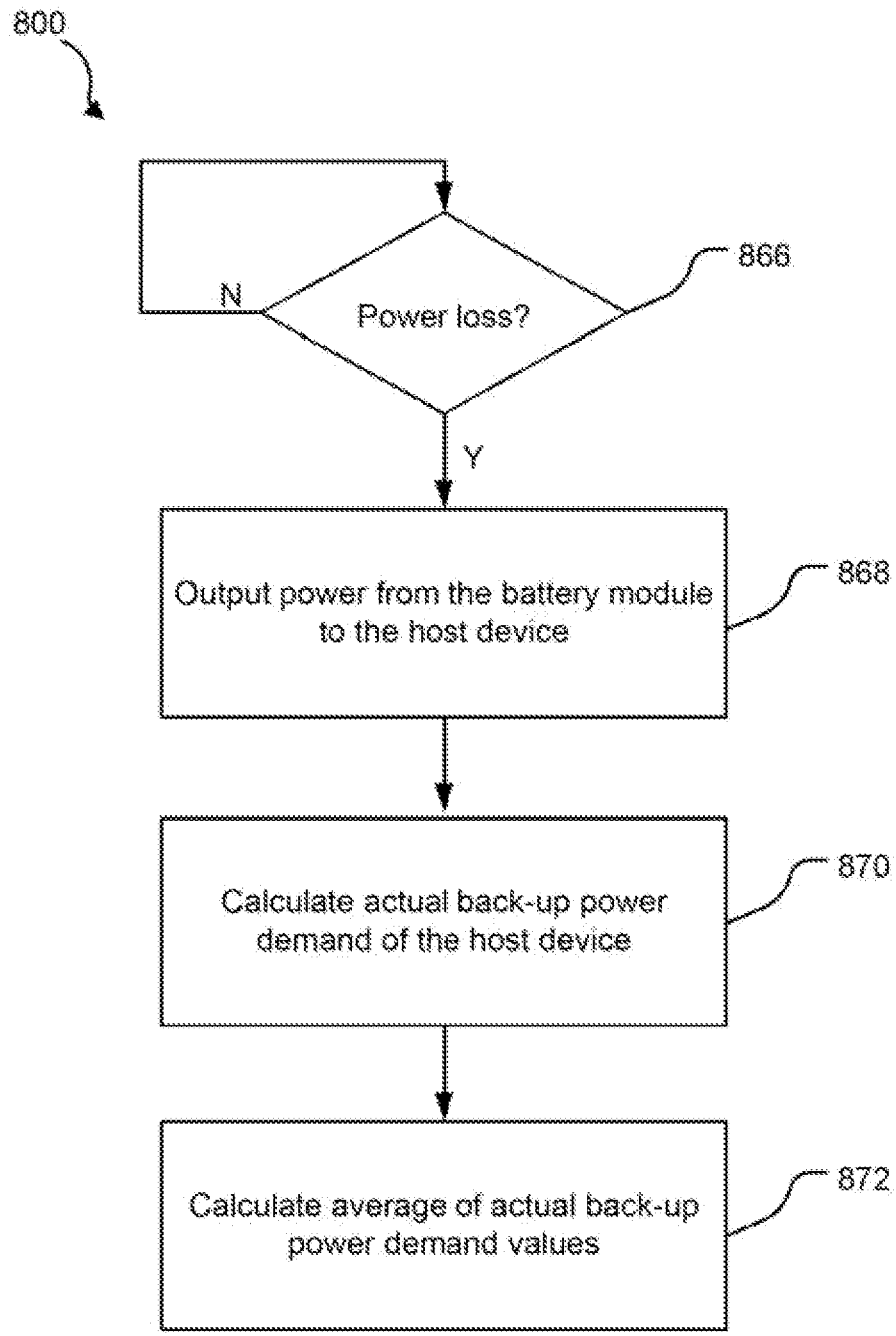

FIG. 8 illustrates a method 800 for operating a back-up power subsystem in which a battery module has been selectively enabled, in accordance with various implementations. The method 800 may begin or proceed with determining a loss of power to the host device at block 866. If there is no power loss event, the method 800 may proceed back to block 866 until a power loss event.

After the occurrence of a power loss event, the method 800 may proceed to block 888 with outputting power outputting power from the battery module to the host device. During or after the outputting of the back-up power, the back-up power control module may calculate the actual back-up power demand of the host device, at block 870, which may comprise the actual back-up power provided to the loads of the host device during the power loss event. The calculated actual back-up power demand may then be averaged with at least one other previously-calculated actual back-up power demand of the host device, at block 872. The average back-up power demand may be used subsequently for selectively enabling or disabling an output of power from the battery module to the host device, in accordance with the various implementations described herein.

Various aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details, in other instances, well-known features are omitted or simplified in order not to obscure the illustrative embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. An apparatus comprising:
   a battery module to supply back-up power to a host device when a main power fails, the host device having a plurality of loads and designating a subset of loads of the plurality of loads that are to receive the back-up power when the main power fails; and
   a back-up power control module to:
      determine a back-up power demand of the host device by averaging amounts of the back-up power that were output from the battery module to the host device during previous failures of the main power;
      determine the power capacity of the battery module by reducing an actual power capacity of the battery module by a margin percentage of the battery module commensurate with a tolerance percentage of the battery module based on current operating conditions of at least one of the host device and a system in which the host device operates;
      compare the back-up power demand and the power capacity of the battery module to determine whether to disable or enable an output of power from the battery module;
      selectively enable the output of the back-up power from the battery module to the subset of the loads of the host device if the battery module has a power capacity greater than the back-up power demand.

2. The apparatus of claim 1, wherein the back-up power control module is to selectively disable the output of the back-up power from the battery module to the host device if the power capacity is less than the back-up power demand.

3. The apparatus of claim 1, wherein the back-up power control module is to determine the power capacity of the battery module, and compare the back-up power demand and the power capacity of the battery module to determine whether to disable or enable the output of the back-up power from the battery module.

4. The apparatus of claim 1, further comprising an output port to transmit a message to the host device indicating that the battery module is enabled or disabled.

5. The apparatus of claim 1, wherein the back-up power demand comprises an estimate of the back-up power demand calculated based on a quantity of loads of the host device and an estimated power demand per load.

6. The apparatus of claim 5, further comprising an input port to receive the quantity of loads from the host device.

7. The apparatus of claim 1, wherein the subset of the plurality of loads includes fewer than all loads of the plurality of loads.

8. A system comprising:
   a host device having a plurality of loads; and
   a back-up power subsystem to supply back-up power to the host device when a main power fails;
   wherein the host device is to designate a subset of loads of the plurality of loads that is to receive the back-up power when the main power fails, and communicate a number of loads in the subset of loads to the back-up power subsystem; and the back-up power subsystem includes:
a battery module; and
a back-up power control module to:
   determine a historical back-up power demand for the number of loads by averaging amounts of back-up power that were supplied during previous failures of the main power;
   determine an estimated back-up power demand of the host device by:
      when a historical back-up demand for the number of loads is unavailable, multiplying the number of loads by an estimated back-up power usage per load; and otherwise, use the historical back-up demand for the number of loads as the estimated back-up power demand of the host device; and
   selectively enable the battery module to output the back-up power to the subset of the plurality of loads of the host device, if the battery module has a power capacity greater than the estimated back-up power demand.

9. The system of claim 8, wherein the host device is to provide to an input port of the back-up power subsystem a quantity of loads of the host device to be provided back-up power after a power loss event, and wherein the back-up power control module is to estimate the estimated back-up power demand based on the quantity of loads and an estimated power demand per load.

10. The system of claim 8, wherein the back-up power subsystem includes an output port to transmit a message to an input port of the host device indicating whether the battery module is enabled or disabled.

11. The system of claim 8, wherein the subset of the plurality of loads includes fewer than all loads of the plurality of loads.

12. A method of providing back-up power from a battery module to a host device for a power loss event, comprising:
   determining an average back-up power demand of the host device having a quantity of loads based on a plurality of outputs of power from the battery module to the host device of a corresponding plurality of previous power loss events due to previous failures of a main power component supplying the plurality of loads;
   determining whether the quantity of loads has changed from one or more previous quantities of loads associated with the corresponding plurality of previous power loss events, and if so, resetting the average back-up power demand commensurate with the change in the quantities of loads in response to a current power loss event due to failure of the main power component supplying the quantity of loads, selectively enabling an output of power from the battery module to the quantity of loads of the host device if the battery module has a power capacity greater than the average back-up power demand
   determining the power capacity of the battery module, wherein determining the power capacity of the battery module comprises reducing an actual power capacity of the battery module by a margin percentage of the battery module commensurate with a tolerance percentage of the battery module based on current operating conditions of at least one of the host device and a system in which the host device operates; and
   comparing the average back-up power demand and the power capacity of the battery module to determine whether to disable or enable the output of power from the battery module.

13. The method of claim 12, further comprising selectively disabling the output of power from the battery module to the host device if the power capacity is less than the back-up power demand.

14. The method of claim 12, wherein said determining the average back-up power demand comprises estimating the back-up power demand based on a quantity of loads of the host device and an estimated power demand per load.

15. The method of claim 12, wherein said determining the average back-up power demand comprises averaging a plurality of outputs of power from the battery module to the host device of a corresponding plurality of previous power loss events.

16. The method of claim 12, further comprising:
   determining a loss of power to the host device; and
   after the determining of the loss of power, outputting power from the battery module to the host device.

17. The method of claim 12, wherein the subset of the plurality of loads includes fewer than all loads of the plurality of loads.

18. The method of claim 12, wherein determining the power capacity of the battery module comprises reducing an actual power capacity of the battery module by a margin percentage of the battery module commensurate with the battery module's age.

* * * * *